(12) United States Patent
Choi

(10) Patent No.: US 10,841,474 B2
(45) Date of Patent: Nov. 17, 2020

(54) CAMERA MODULE

(71) Applicant: LG INNOTEK CO., LTD., Seoul (KR)

(72) Inventor: Yong Bok Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 291 days.

(21) Appl. No.: 16/068,616

(22) PCT Filed: Jan. 5, 2017

(86) PCT No.: PCT/KR2017/000119
§ 371 (c)(1),
(2) Date: Jul. 6, 2018

(87) PCT Pub. No.: WO2017/119727
PCT Pub. Date: Jul. 13, 2017

(65) Prior Publication Data
US 2019/0028624 A1 Jan. 24, 2019

(30) Foreign Application Priority Data
Jan. 8, 2016 (KR) .................. 10-2016-0002480

(51) Int. Cl.
| G02B 3/00 | (2006.01) |
| H04N 5/225 | (2006.01) |
| G02B 26/00 | (2006.01) |
| G02B 3/12 | (2006.01) |
| G02B 7/02 | (2006.01) |
| G02B 13/00 | (2006.01) |

(Continued)

(52) U.S. Cl.
CPC .......... *H04N 5/2257* (2013.01); *G02B 3/12* (2013.01); *G02B 3/14* (2013.01); *G02B 7/021* (2013.01); *G02B 13/0075* (2013.01); *G02B 26/004* (2013.01); *H04N 5/2253* (2013.01); *H04N 5/2254* (2013.01); *G02B 5/208* (2013.01)

(58) Field of Classification Search
CPC ...................................................... H04N 5/2257
USPC ......................................................... 359/665
See application file for complete search history.

(56) References Cited

U.S. PATENT DOCUMENTS

| 2012/0170923 A1 | 7/2012 | Seo | |
| 2016/0178925 A1* | 6/2016 | Park | G02B 27/646 |
| | | | 359/557 |

FOREIGN PATENT DOCUMENTS

| CN | 103930309 A | 7/2014 |
| CN | 104698566 A | 6/2015 |

(Continued)

OTHER PUBLICATIONS

International Search Report in International Application No. PCT/KR2017/000119, filed Jan. 5, 2017.

(Continued)

*Primary Examiner* — James C. Jones
(74) *Attorney, Agent, or Firm* — Saliwanchik, Lloyd & Eisenschenk

(57) ABSTRACT

One embodiment of a camera module may comprise: a first lens unit including at least one lens; a second lens unit disposed facing the first lens in an optical axis direction, and including at least one lens; a printed circuit board disposed facing the second lens unit; and a base accommodating the second lens unit, and having a conductive resilient member mounted thereon which electrically connects the first lens unit and the printed circuit board.

19 Claims, 5 Drawing Sheets

(51) Int. Cl.
G02B 3/14 (2006.01)
G02B 5/20 (2006.01)

(56) References Cited

FOREIGN PATENT DOCUMENTS

| | | |
|---|---|---|
| KR | 10-2009-0125547 A | 12/2009 |
| KR | 10-2012-0007730 A | 1/2012 |
| KR | 10-2012-0076285 A | 7/2012 |
| KR | 10-2015-0064980 A | 6/2015 |
| KR | 10-2015-0064987 A | 6/2015 |

OTHER PUBLICATIONS

Office Action dated Apr. 22, 2020 in Chinese Application No. 201780006117.2.

* cited by examiner

CAMERA MODULE

CROSS-REFERENCE TO RELATED APPLICATIONS

This application is the U.S. national stage application of International Patent Application No. PCT/KR2017/00019, filed Jan. 5, 2017, which claims priority to Korean Application No. 10-2016-0002480, filed Jan. 8, 2016, the disclosures of each of which are incorporated herein by reference in their entirety.

TECHNICAL FIELD

Embodiments relate to a camera module.

BACKGROUND ART

Contents which will be described hereinafter do not constitute related art and serve simply to provide background information of embodiments.

Recently, IT products, such as a mobile terminal, a smartphone, a tablet PC, and a notebook with a micro digital camera installed thereon, have been vigorously developed.

In a camera module mounted in a small electronic product, such as a smartphone, an autofocusing apparatus may be installed. Further, the camera module may include a lens unit forming an optical system, an image sensor disposed facing the lens unit in an optical axis direction so that light incident through the lens unit reaches the image sensor and thus an image is formed on the image sensor, etc.

If respective parts of such a camera module are assembled, in order to align the respective parts to designed positions, an active alignment process may be performed.

When the active alignment process is performed, the active alignment process may be easily and effectively performed as long as the active alignment process is performed under the condition that the respective parts of the camera module are operated.

DISCLOSURE

Technical Problem

Embodiments provide a camera module having a structure in which an active alignment process may be performed under the condition that respective parts of the camera module are operated.

Technical objects of embodiments are not limited to the above-described objects, and additional advantages, objects, and features of the embodiments will be set forth in part in the description which follows and in part will become apparent to those having ordinary skill in the art upon examination of the following or may be learned from practice of the embodiments.

Technical Solution

In one embodiment, a camera module includes a first lens unit including at least one lens, a second lens unit disposed facing the first lens in an optical axis direction and including at least one lens, a printed circuit board disposed facing the second lens unit, and a base accommodating the second lens unit and having conductive resilient members mounted thereon to conductively connect the first lens unit and the printed circuit board.

In another embodiment, a camera module includes a first lens unit including at least one liquid lens having curvature changed according to electrical signals, a second lens unit disposed facing the first lens in an optical axis direction and including at least one lens, a printed circuit board disposed facing the second lens unit, a base accommodating the second lens unit, conductive resilient members mounted on the base and conductively connecting the first lens unit and the printed circuit board, and ground electrodes passing through the base to conductively connect the first lens unit and the printed circuit board.

In yet another embodiment, a camera module includes a first lens unit including at least one liquid lens having curvature changed according to electrical signals, a second lens unit disposed facing the first lens in an optical axis direction and including at least one lens, a printed circuit board disposed facing the second lens unit, a base accommodating the second lens unit, conductive resilient members mounted on the base and conductively connecting the first lens unit and the printed circuit board, and a cover member coupled to the base, accommodating the first lens unit and conductively connected to the first lens unit.

Advantageous Effects

In a camera module in accordance with embodiments, conductive resilient members may conductively connect a first lens unit and a printed circuit board and maintain conductive connection between the first lens unit and the printed circuit board even though the first lens unit and/or the printed circuit board slightly move so as to perform active alignment, thereby easily performing an active alignment process.

Further, in the embodiments, since resilient members are not fixedly coupled to the first lens unit and the printed circuit board, a separate process of releasing fixed coupling between the first lens unit and the printed circuit board so as to perform active alignment is unnecessary and, thus, the active alignment process may be easily performed.

Moreover, in the embodiments, electrodes may perform their own role immediately after assembly of the camera module including the first lens unit. Therefore, when the active alignment process after assembly of the camera module is performed, the electrodes are operated in the same manner as other parts of the camera module. Accordingly, since the active alignment process may be performed under the condition that the respective parts of the camera module are operated, accurate and effective active alignment may be carried out.

In the embodiments, if a cover member is used as a ground part and the printed circuit board is conductively connected to the cover member, the printed circuit board may be easily grounded without formation of a separate ground electrode.

Further, the cover member may accommodate and protect the respective parts of the camera module and, thus, the camera module may have a solid structure which may effectively withstand external mechanical and electrical impact.

BEST MODE

Figure 1:
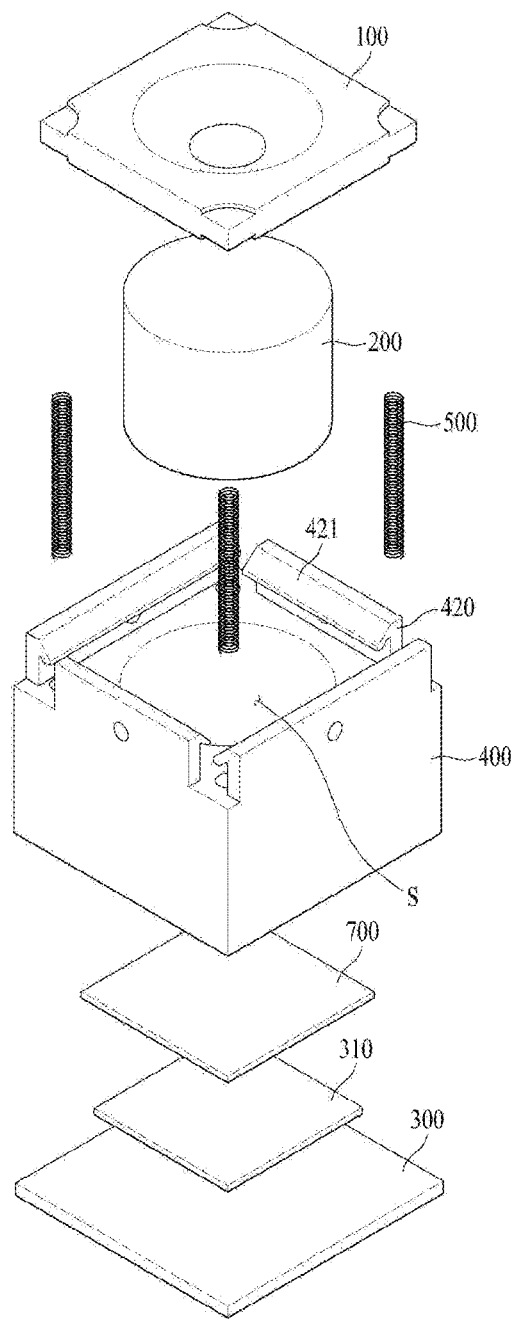
FIG. 1 is an exploded perspective view illustrating a camera module in accordance with one embodiment.

Hereinafter, embodiments will be described with reference to the annexed drawings and description. However, the embodiments set forth herein may be variously modified, and it should be understood that there is no intent to limit the disclosure to the particular forms disclosed. However, the embodiments are to cover all modifications, equivalents, and alternatives falling within the spirit and scope of the disclosure as defined by the claims. Here, sizes or shapes of elements illustrated in the drawings may be exaggerated for clarity and convenience of description.

It will be understood that, although the terms "first", "second", etc. may be used herein to describe various elements, these terms do not limit the elements. These terms are used only to discriminate one substance or element from other substances or elements. Further, terms specially defined in consideration of the configurations and functions of the embodiments serve only to describe the embodiments and do not limit the scope of the disclosure.

In the following description of the embodiments, it will be understood that, when each element is referred to as being formed "on" or "under" another element, it can be directly "on" or "under" the other element or be indirectly formed with one or more intervening elements therebetween. Further, when an element is referred to as being formed "on" or "under" another element, not only the upward direction of the former element but also the downward direction of the former element may be included.

In addition, it will be understood that, although the relational terms "on/above/upper", "under/below/lower", etc. may be used herein to describe various elements, these terms neither necessarily require nor connote any physical or logical relations between substances or elements or the order thereof, and are used only to discriminate one substance or element from other substances or elements.

Further, in the drawings, a Cartesian coordinate system (x, y, z) may be used. In the drawings, the x-axis and the y-axis define a plane which is perpendicular to an optical axis and, for convenience, an optical axis direction (the z-axis direction) may be referred to as a first direction, the x-axis direction may be referred to as a second direction, and the y-axis direction may be referred to as a third direction.

FIG. 1 is an exploded perspective view illustrating a camera module in accordance with one embodiment. The camera module in accordance with the embodiment may include a first lens unit 100, a second lens unit 200, a printed circuit board 300, a base 400, resilient members 500, electrodes 600 and a filter 700.

The first lens unit 100 may include at least one lens. Particularly, the first lens unit 100 may include at least one liquid lens (not shown).

The liquid lens may receive an electrical signal applied thereto and thus change curvature thereof, thereby adjusting a focal length of the camera module. Here, by properly changing the curvature of the liquid lens through feedback control, an autofocus function of the camera module may be implemented.

The liquid lens may be formed, for example, by filling a membrane formed of a flexible and transparent material with a transparent liquid so that the curvature of the membrane is changed.

Here, when an electrical signal is applied to the liquid lens, the curvature of the membrane may be changed and, the autofocus function of the camera module may be implemented through feedback control of the curvature of the membrane.

As a means of changing the curvature of the membrane by receiving an electrical signal, for example, a micro driving device using a piezoelectric element or Micro Electro Mechanical System (MEMS) technology may be used.

The second lens unit 200 may be disposed facing the first lens in the optical axis direction and include at least one lens. In the second lens unit 200, a plurality of lenses may be arranged in the optical axis direction to form an optical system.

The second lens unit 200 may be, for example, a lens barrel in which a plurality of lenses is arranged in the optical axis direction.

The printed circuit board 300 may be disposed facing the second lens unit 200. The printed circuit board 300 may be conductively connected to the first lens unit 100 and apply an electrical signal to the second lens unit 200.

The printed circuit board 300 may be conductively connected to an external apparatus so as to apply an electrical signal to the first lens unit 100, and be operated by current applied from the external apparatus and thus implement control to autofocus the first lens unit 100.

For this purpose, various elements and circuit patterns to receive current may be provided on the printed circuit board 300. Further, various control elements to apply an electrical signal to the first lens unit 100 so as to perform the autofocus function of the first lens unit 100 may be provided on the printed circuit board 300.

The printed circuit board 300 may include an image sensor 310. The image sensor 310 may be disposed facing the first lens and the second lens in the optical axis direction, i.e., the first direction. The image sensor 310 is a region which light incident through the first lens and the second lens reaches so that an image of a subject is formed thereon.

The image formed on the image sensor 310 may be converted into an electrical signal and the electrical signal may be transmitted to a display device, a memory, etc., which are separately provided, through the printed circuit board 300.

Since a clear image should be formed on the image sensor 310 through autofocus, clear image formation may be achieved by performing the autofocus function of the first lens unit 100, as described above.

The base 400 may accommodate the second lens unit 200, and the conductive resilient members 500 conductively connecting the first lens unit 100 to the printed circuit board 300 may be mounted on the base 400. Through holes 410 to mount the resilient members 500 on the base 400 may be formed through the base 400.

The base 400 may be formed, for example, as a hollow type, as exemplarily shown in FIG. 1, the through holes 410 may be formed through the inner wall of the base 400 in the optical axis direction, i.e., the first direction, and the resilient members 500 may be inserted into the through holes 410.

For example, the base 400 may be formed to have a rectangular shape having a hollow, as seen from the first direction, and the through holes 410 may be formed at corner parts of the base 400. Here, the resilient members 500 may be inserted into the through holes 410 so that both ends of the resilient members 500 may contact the first lens unit 100 and the printed circuit board 300 and thus conductively connect the first lens unit 100 and the printed circuit board 300.

That is, the resilient member 500 may be formed of a conductive material, and one end of the resilient member 500 may apply pressure to the first lens unit 100 so as to contact the first lens unit 100 and the other end of the resilient member 500 may apply pressure to the printed circuit board 300 so as to contact the printed circuit board 300 and, thus, the resilient member 500 may serve to conductively connect the first lens unit 100 to the printed circuit board 300.

When the camera module is assembled, an active alignment process may be performed. The active alignment process is a process in which, after assembly of the camera module, the first lens unit 100, the second lens unit 200, the image sensor 310, etc. are aligned to designed positions.

Therefore, when the active alignment process is performed, it is proper that the active alignment process is performed under the condition that respective parts of the camera module are operated.

For example, in order to align the first lens unit 100 and the second lens unit 200 to positions designed in the optical axis direction with respect to the image sensor 310, it is proper that the active alignment process is performed while checking quality and focal length of an image formed on the image sensor 310.

Therefore, if the active alignment process is performed after assembly of the parts of the camera module, in order to check the state of the image formed on the image sensor 310, it is proper that the conductive connection state between the first lens unit 100 and the printed circuit board 300 is maintained even though the parts of the camera module move.

In this embodiment, since the resilient members 500 conductively connect the first lens unit 100 and the printed circuit board 300, for example, even though the first lens unit 100 and the printed circuit board 300 slightly move so as to perform the active alignment process after assembly of the camera module, the conductive connection state therebetween may be maintained by elastic force of the resilient members 500.

Therefore, in this embodiment, since the resilient members 500 may conductively connect the first lens unit 100 and the printed circuit board 300 and maintain the conductive connection state between the first lens unit 100 and the printed circuit board 300 even though the first lens unit 100 and/or the printed circuit board 300 slightly move so as to perform active alignment, the active alignment process may be easily performed.

Further, in this embodiment, since the resilient members 500 are not fixedly coupled to the first lens unit 100 and the printed circuit board 300, a separate process of releasing fixed coupling between the first lens unit 100 and the printed circuit board 300 so as to perform active alignment is unnecessary and, thus, the active alignment process may be easily performed.

As exemplarily shown in FIG. 1, for example, a plurality of through holes 410, particularly, a total of four through holes 410, each through hole 410 being provided at each corner part of the base 400, may be formed. Further, a total of four resilient members 500 corresponding to the four through holes 410, each resilient member 500 being inserted into each through hole 410, may be provided.

The reason for this is that the first lens unit 100 should be controlled such that the first lens unit 100 is deformed in the x-axis direction, i.e., the second direction, and the y-axis direction, i.e., the third direction, in the x-y plane perpendicular to the first direction so as to perform autofocus, two elements to control such deformation should be provided, and each element requires two terminals to receive an electrical signal applied thereto.

Therefore, in order to autofocus the first lens unit 100, a total of four terminals may be provided and the respective terminals may be conductively connected to the printed circuit board 300 by the resilient members 500. For this purpose, a total of four resilient members 500 may be provided.

For example, if the first lens unit 100 performs autofocus using a liquid lens, curvature of the liquid lens may be changed in the second direction and third direction in the x-y plane.

Here, the two terminals provided at the element or device which changes curvature of the liquid lens in the second direction may be conductively connected to the printed circuit board 300 by the two resilient members 500.

In the same manner, the two terminals provided at the element or device which changes curvature of the liquid lens in the third direction may be conductively connected to the printed circuit board 300 by the remaining two resilient members 500.

Further, since the resilient members 500 are arranged at the corner parts of the base 400 so as to be symmetrical to one another about the center of the resilient members 500 or be provided radially from the center of the resilient members 500 and may thus uniformly apply pressure to the first lens unit 100 in the first direction, the first lens unit 100 may maintain a coupled state to the base 400 without tilting in the x-y plane.

Protrusions 420 and hooks 421 may be formed on the base 400. That is, the base 400 may include the protrusions 420 protruding from the upper surface thereof, and the hooks 421 to couple the first lens unit 100 to the base 400 may be formed at the upper ends of the protrusions 420.

For example, a total of four hooks 421 may be formed in length directions of the respective sides of the base 400 having a rectangular shape.

Figure 2:
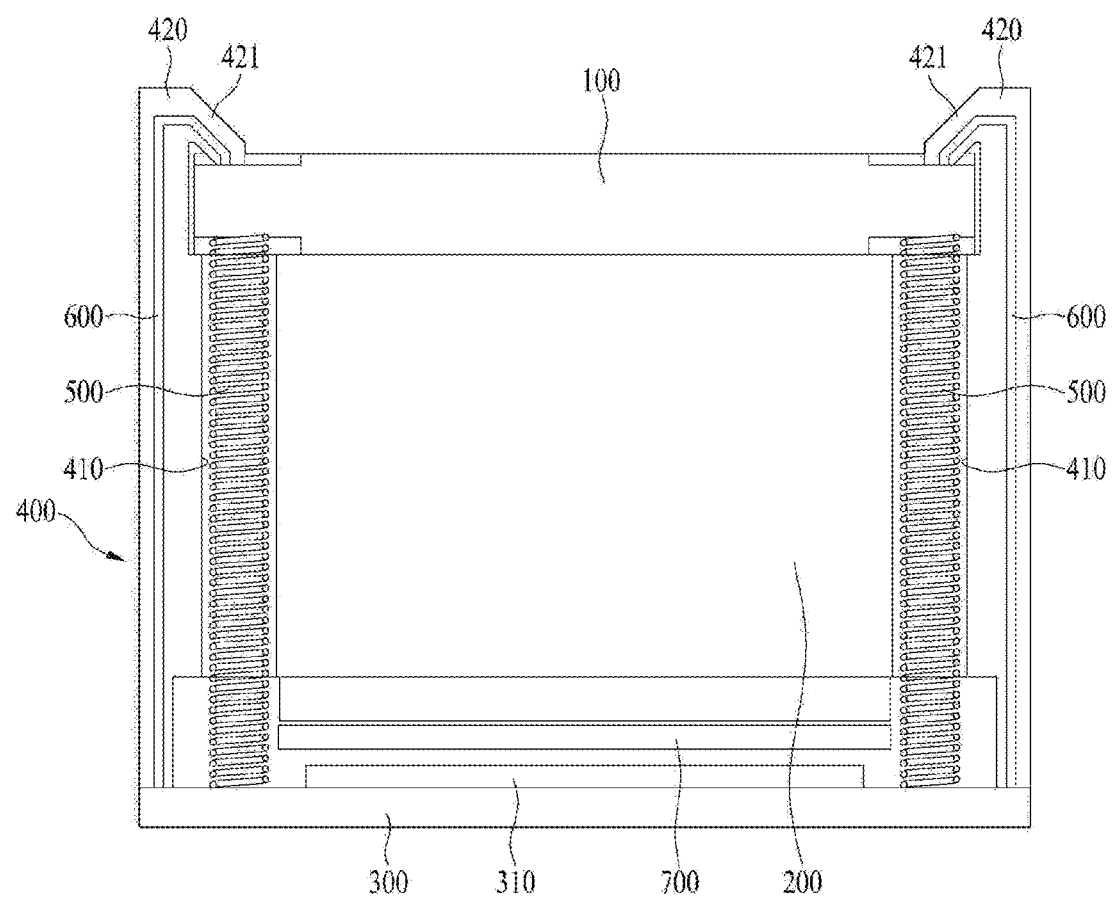
FIG. 2 is a cross-sectional view illustrating the camera module in accordance with the embodiment.

As exemplarily shown in FIGS. 1 and 2, the hook 421 has a staircase shape having an inclined upper part and a vertical lower part. The hooks 421 having such a structure may easily couple the first lens unit 100 to the base 400 and maintain a stable coupling state between the first lens unit 100 and the base 400 after coupling.

That is, if the first lens unit 100 is coupled to the base 400, when pressure is applied to the first lens unit 100 in the downward direction, the first lens unit 100 may descend along the inclined parts of the hooks 421 and be thus easily coupled to the base 400.

After coupling the first lens unit 100 to the base 400, the first lens unit 100 is not easily separated from the base 400 and the coupling state between the first lens unit 100 and the base 400 may be stably maintained by the staircase shape of the hooks 421.

The filter 700 may be arranged between the second lens and the image sensor 310 so as to face the second lens and the image sensor 310 and to be spaced apart from the second lens and the image sensor 310 in the optical axis direction, i.e., the first direction.

The filter 700 may block light of a specific frequency out of light incident through the first lens unit 100 and the second lens unit 200 and thus serve to improve quality of an image formed on the image sensor 310. For example, an infrared cut filter 700 may be provided as the filter 700.

FIG. 2 is a cross-sectional view illustrating the camera module in accordance with one embodiment. As exemplarily shown in FIG. 2, the resilient members 500 apply pressure to the first lens unit 100 in the upward direction, and the hooks 421 formed at the protrusions 420 may serve as stoppers which inhibit the first lens unit 100 from deviating from the designed position.

Further, as exemplarily shown in FIG. 2, the camera module in accordance with this embodiment may include the electrodes 600. At least a part of the electrode 600 may pass through the base 400 in the first direction.

In more detail, a part of the electrode 600 may pass through the base 400 from the lower surface of the base 400 and be disposed in the first direction, and the remainder of the electrode 600 may pass through the protrusion 420 and the end of the hook 421.

Here, as exemplarily shown in FIG. 2, the hook 421 may have a part which is bent from the protrusion 420 in the downward direction so as to be inclined and, thus, a portion of the upper part of the electrode 600 may be bent according to the shape of the hook 421.

Due to such a structure, one end of the electrode 600 may pass through the end of the hook 421 and be conductively connected to the first lens, and the other end of the electrode 600 may pass through the lower part of the base 400 and be conductively connected to the printed circuit board 300.

Here, in order to achieve firm conductive contact between the electrode 600 and the first lens unit 100, one end of the electrode 600, which passes through the end of the hook 421, may protrude longer than the end of the hook 421 contacting the first lens unit 100.

Further, in order to achieve conductive contact between the electrode 600 and the printed circuit board 300, the other end of the electrode 600, which passes through the lower part of the base 400, may be coupled to the printed circuit board 300 by soldering.

In another embodiment, if the other end of the electrode 600 is provided to protrude longer than the lower surface of the base 400 and the printed circuit board 300 is coupled to the base 400 by an adhesive, etc., a protruding portion 420 of the other end of the electrode 600 may contact a terminal formed on the printed circuit board 300 and thus the electrode 600 and the printed circuit board 300 may be conductively connected.

A total of four electrodes 600, each electrode 600 passing through each side of the base 400 in the first direction, may be provided. Here, in order to inhibit electrical short caused by contact between the electrodes 600 and the resilient members 500, the electrodes 600 and the resilient members 500 are arranged at positions spaced apart from each other in the x-y plane.

Here, the electrodes 600 may be, for example, ground electrodes. Therefore, if a total of four resilient members 500 is provided, a total of four electrodes 600 corresponding to the four electric members 500 may be provided so as to serve as ground electrodes.

However, in another embodiment, if the electrodes 600 serve as ground electrodes, the number of the electrodes 600 may be smaller than the number of the resilient members 500. Therefore, the required number of the electrodes 600 may be provided according to roles thereof. That is, the number of the electrodes 600 may be equal to or less or greater than the number of the resilient members 500.

For example, the base 400 may be manufactured through an insert molding method and, thus, the electrodes 600 may be easily disposed and provided in the base 400.

Due to such a structure, the electrodes 600 may perform their role immediately after assembly of the camera module including the first lens unit 100. Therefore, when the active alignment process is performed after assembly of the camera module, the electrodes 600 are operated in the same manner as other parts of the camera module.

Therefore, since the active alignment process may be performed under the condition that the respective parts of the camera module are operated, active alignment may be effectively carried out.

Figure 3:
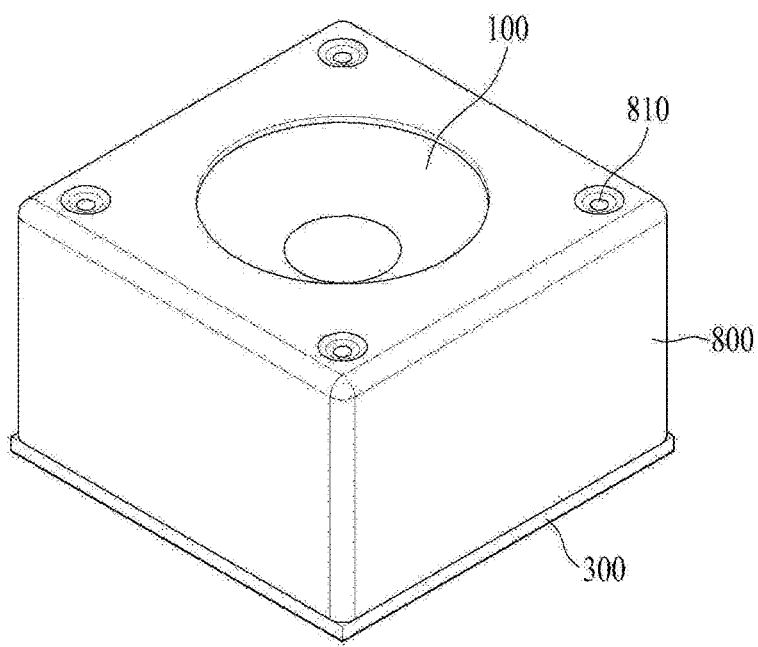
FIG. 3 is a perspective view illustrating a camera module in accordance with another embodiment.
Figure 4:
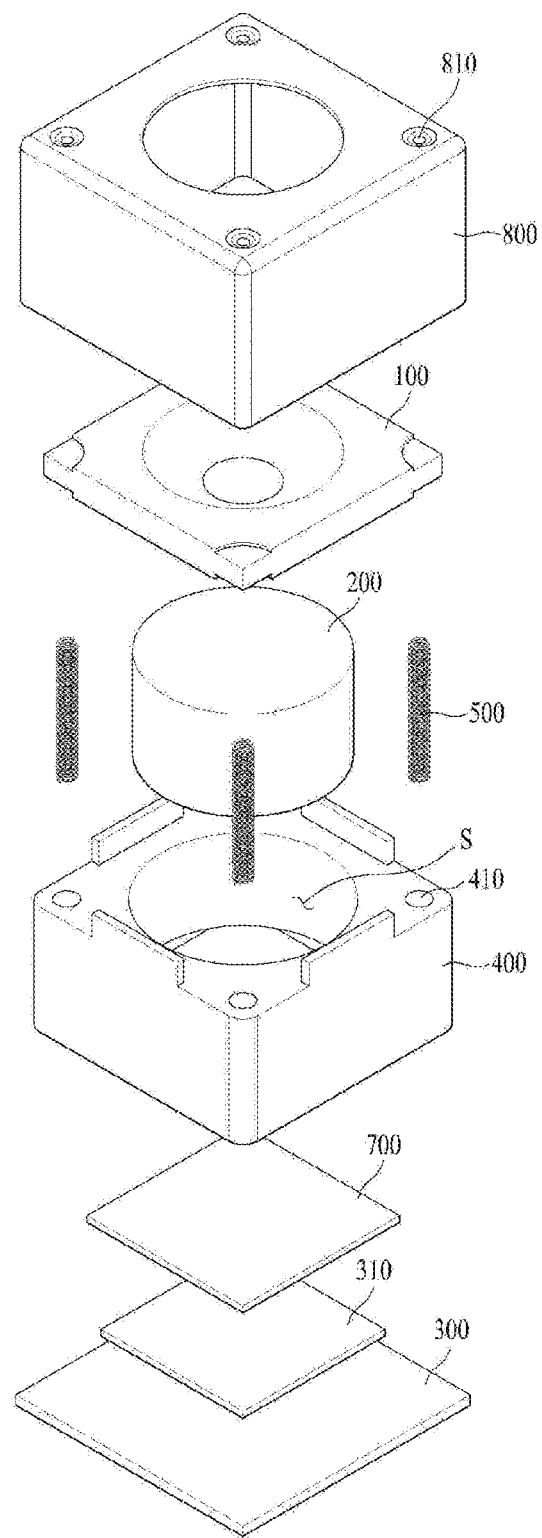
FIG. 4 is an exploded perspective view illustrating the camera module in accordance with the embodiment.

FIG. 3 is a perspective view illustrating a camera module in accordance with another embodiment. FIG. 4 is an exploded perspective view illustrating the camera module in accordance with the embodiment. The camera module in accordance with this embodiment may include a first lens unit 100, a second lens unit 200, a printed circuit board 300, a base 400, resilient members 500, a filter 700 and a cover member 800.

The structures of the first lens unit 100, the second lens unit 200, the printed circuit board 300, the resilient members 500 and the filter 700 of this embodiment are substantially the same as those of the embodiment shown in FIGS. 1 and 2 and a detailed description thereof will thus be omitted because it is considered to be unnecessary.

Protrusions 420 of the base 400 of this embodiment have a similar structure to the protrusions 420 of the embodiment shown in FIGS. 1 and 2 except that hooks 421 are not provided at the upper ends of the protrusions 420 of this embodiment.

The cover member 800 may be coupled to the base 400, accommodate the first lens unit 100 and be conductively connected to the first lens unit 100. Further, the cover member 800 may accommodate the second lens unit 200, the printed circuit board 300, the resilient members 500 and the filter 700.

The cover member 800 may have contact parts 810. The contact parts 810 may protrude downwardly in the first direction and serve to conductively connect the cover member 800 and the first lens unit 100, as exemplarily shown in FIGS. 1 and 2.

Here, the cover member 800 may have, for example, a square pillar shape having a hollow, and the contact parts 810 may be provided at respective corner parts of the cover member 800 without being limited thereto.

Figure 5:
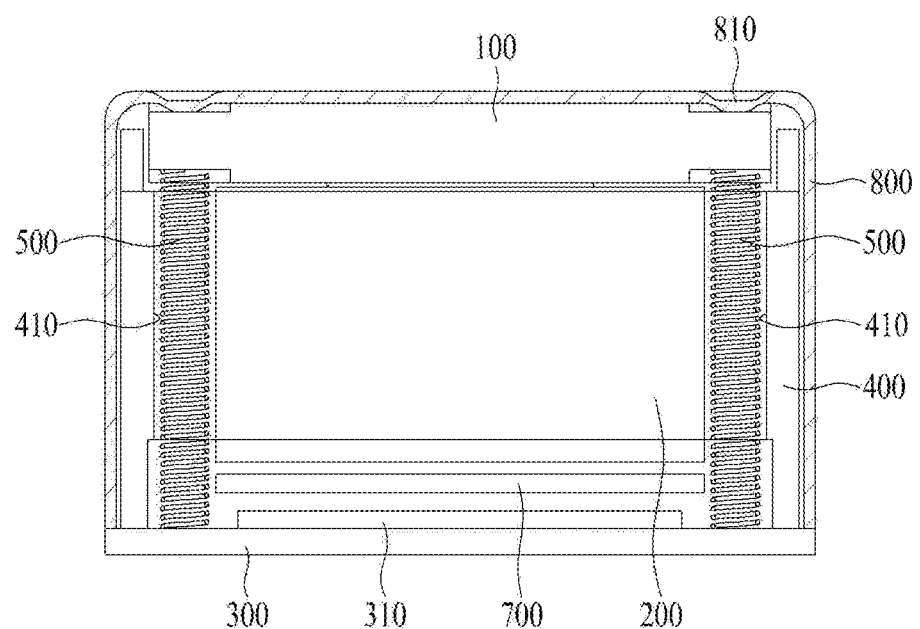
FIG. 5 is a cross-sectional view illustrating a camera module in accordance with yet another embodiment.

FIG. 5 is a cross-sectional view illustrating a camera module in accordance with yet another embodiment. As exemplarily shown in FIG. 5, an upper surface of a first lens unit 100 may be conductively connected to a cover member 800 by contact with contact parts 810, and a lower surface of the first lens unit 100 may be conductively connected to a printed circuit board 300 by contact with resilient members 500.

That is, the cover member 800 may be coupled to the printed circuit board 300 by adhesion, etc., and thus the camera module may be assembled. When the camera module is assembled, the conductive resilient members 500 may contact and be conductively connected to the first lens unit 100 while applying pressure to the lower surface of the first lens unit 100.

Further, when the camera module is assembled, the contact parts 810 may contact the upper surface of the first lens unit 100 while applying pressure to the upper surface of the first lens nit 100 and, thus, the first lens unit 100 and the cover member 800 may be conductively connected. Due to such a structure, the printed circuit board 300 may be conductively connected to the cover member 800 by the resilient members 500 and the contact parts 810.

In such a structure, the cover member 800 may serve as a ground part. Therefore, the printed circuit board 300 may be conductively connected to the cover member 800 and thus form a ground structure in which the cover member 800 serves as the ground part.

In this embodiment, if the cover member 800 is used as the ground part and the printed circuit board 300 is conductively connected to the cover member 800, the printed circuit board 300 may be easily grounded without formation of a separate ground electrode.

Further, the cover member 800 may accommodate and protect the respective parts of the camera module and, thus, the camera module may have a solid structure which may effectively withstand external mechanical and electrical impact.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

INDUSTRIAL APPLICABILITY

In a camera module in accordance with one embodiment, a first lens unit and a printed circuit board may be conductively connected using conductive resilient members, and the resilient members may maintain conductive connection between the first lens unit and the printed circuit board even though the first lens unit and/or the printed circuit board slightly move so as to perform active alignment, thereby easily performing an active alignment process. Therefore, the camera module is industrially applicable.

The invention claimed is:

1. A camera module comprising:
   a first lens unit comprising at least one lens;
   a second lens unit disposed facing the first lens unit in an optical axis direction and comprising at least one lens;
   a printed circuit board disposed facing the second lens unit; and
   a base accommodating the second lens unit and having conductive resilient members mounted thereon to conductively connect the first lens unit and the printed circuit board,
   wherein one end of each conductive resilient member applies pressure to the first lens unit so as to contact the first lens unit and the other end of each resilient member applies pressure to the printed circuit board so as to contact the printed circuit board and thereby conductively connect the first lens unit and the printed circuit board.

2. The camera module according to claim 1, wherein the first lens unit comprises at least one liquid lens having curvature changed according to electrical signals.

3. The camera module according to claim 1, wherein:
   the base is formed as a hollow type, and through holes are formed through an inner wall of the base in a first direction corresponding to the optical axis direction; and
   the resilient members are inserted into the through holes.

4. The camera module according to claim 3, wherein the base is formed to have a rectangular shape having a hollow, as seen from the first direction, and the through holes are formed at corner parts of the base.

5. The camera module according to claim 4, wherein a plurality of the through holes is provided, the total number of the through holes is four, each through hole being provided at a respective corner part of the base, and the total number of the resilient members is four, each resilient member being inserted into a respective through hole.

6. The camera module according to claim 4, wherein the base comprises protrusions protruding from an upper surface thereof, and hooks to couple the first lens unit to the base are formed at upper ends of the protrusions.

7. The camera module according to claim 6, wherein the total number of the hooks is four, each hook being formed in a length direction of each side of the base.

8. The camera module according to claim 6, wherein the base is provided with electrodes, at least a part of each electrode passing through the base in the first direction.

9. The camera module according to claim 8, wherein:
   one end of each electrode passes through an end of the hook and is conductively connected to the first lens; and
   the other end of each electrode passes through a lower part of the base and is conductively connected to the printed circuit board.

10. The camera module according to claim 8, wherein the total number of the electrodes is four, each electrode passing through a respective side of the base in the first direction.

11. The camera module according to claim 8, wherein the electrodes are provided as ground electrodes.

12. The camera module according to claim 1, wherein the printed circuit board comprises an image sensor disposed facing the first lens and the second lens in a first direction corresponding to the optical axis direction.

13. The camera module according to claim 12, further comprising a filter arranged between the second lens and the image sensor so as to face the second lens and the image sensor and to be spaced apart from the second lens and the image sensor in the optical axis direction.

14. The camera module according to claim 13, wherein the filter is an infrared cut filter.

15. A camera module comprising:
   a first lens unit comprising at least one liquid lens having curvature changed according to electrical signals;
   a second lens unit disposed facing the first lens unit in an optical axis direction and comprising at least one lens;
   a printed circuit board disposed facing the second lens unit;
   a base accommodating the second lens unit;
   conductive resilient members mounted on the base and conductively connecting the first lens unit and the printed circuit board; and
   ground electrodes passing through the base to conductively connect the first lens unit and the printed circuit board.

16. A camera module comprising:
   a first lens unit comprising at least one liquid lens having curvature changed according to electrical signals;
   a second lens unit disposed facing the first lens unit in an optical axis direction and comprising at least one lens;
   a printed circuit board disposed facing the second lens unit;
   a base accommodating the second lens unit;
   conductive resilient members mounted on the base and conductively connecting the first lens unit and the printed circuit board; and a cover member coupled to the base, accommodating the first lens unit and conductively connected to the first lens unit.

17. The camera module according to claim 16, wherein the cover member comprises contact parts protruding downwardly in the first direction and conductively connecting the cover member and the first lens unit.

18. The camera module according to claim 17, wherein an upper surface of the first lens unit is conductively connected to the cover member by contact with the contact parts, and a lower surface of the first lens unit is conductively connected to the printed circuit board by contact with the resilient members.

19. The camera module according to claim 17, wherein the cover member has a square pillar shape having a hollow, and each of the contact parts is provided at a respective corner part of the cover member.

* * * * *